TRANSISTOR AMPLIFIER FOR PHOTOMULTIPLIER TUBE OUTPUT

Filed Nov. 23, 1965

INVENTOR.
MICHAEL VINET LAMASNEY
BY
Laurence S. Epstein
ATTORNEYS

United States Patent Office 3,435,357
Patented Mar. 25, 1969

3,435,357

TRANSISTOR AMPLIFIER FOR PHOTOMULTIPLIER TUBE OUTPUT

Michael V. Lamasney, Palo Alto, Calif., assignor, by mesne assignments, to the United States of America as represented by the Secretary of the Navy Filed Nov. 23, 1965, Ser. No. 510,156
Int. Cl. H03f 3/68
U.S. Cl. 330—20 1 Claim

ABSTRACT OF THE DISCLOSURE

A transistorized amplifier for the output from a photomultiplier tube anode, the amplifier characterized by a grounded or common base amplifier stage having the emitter connected directly to the photomultiplier anode, and one or more transistor amplifier output stages of emitter follower configuration.

This invention relates to photomultiplier circuits, and more particularly to the output load circuit for a photomultiplier tube.

Photomultiplier circuits which are utilized to detect the presence and amount of light flux have suffered from certain defects. Among these were the lack of wide-frequency response, and linearity with respect to the electric output signal and the incident light on the photomultiplier's tube photocathode. The reason for this was that the photomultiplier was ordinarily returned to ground through its anode via a large fixed resistor, which developed the output signal voltage resulting from the output current of the photomultiplier which was collected at its anode. A detailed discussion of photomultiplier tubes, their operation, and circuits utilized therewith, can be found in Frederick E. Terman's "Applied Electronics," Second Edition, published by John Wiley & Sons, Inc., New York, New York, 1955, pages 110–123.

Accordingly, one of the objects of the present invention is to provide an improved photomultiplier circuit.

Another object of the instant invention is to provide a photomultiplier circuit which provides an improved frequency response.

Still another object of the present invention is to provide a photomultiplier circuit which has increased linearity.

An additional object of the present invention is to provide a photomultiplier circuit which has an improved wider frequency response.

A further object of the present invention is to provide an output load circuit for a photomultiplier tube which is of a low impedance so as to maximize resulting output current from a photomultiplier.

Basically, the above results have been achieved by the present invention, by utilizing a low impedance load which included a grounded base transistor stage having its emitter coupled to the photomultiplier tube's anode, and developing output signals across the transistor's collector load.

Figure 1:
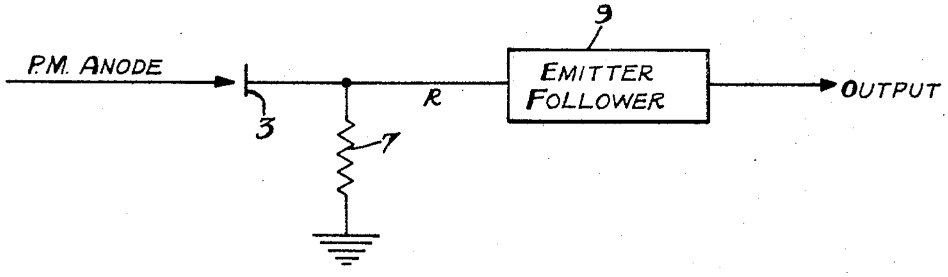
Figure 2:
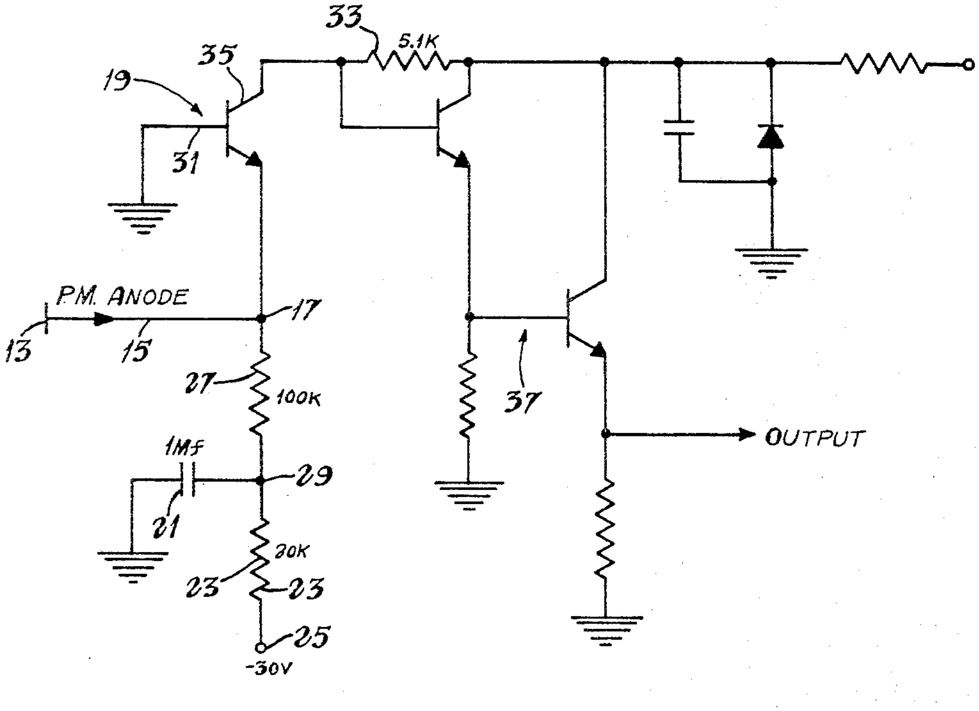

Other objects and many of the attendant advantages of this invention will be readily appreciated as the same becomes better understood by reference to the following detailed description when considered in connection with the accompanying drawings wherein:

FIG. 1 illustrates the prior art circuitry partly in schematic form, and partly in functional block diagram form; and FIG. 2 illustrates in detailed schematic form the present invention.

Referring to FIG. 1, there is illustrated, the previous manner in which the output of a photomultiplier tube was derived. The photomultiplier tube's anode 3 was coupled directly to ground, through a fixed resistor 7, and then sampling the voltage developed across said resistor 7, due to the photomultiplier's output current resulting from the light incident on its photocathode (not shown), and then coupling the signal developed across said resistor 7, to a conventional emitter-follower stage 9; and hence to an appropriate output indicating means (not shown). The main disadvantage of this system was, that because of the small currents involved, this output load resistor 7, had to be very large in order to develop a usable voltage level. As a consequence of this load 7 being of a high impedance, interelectrode and stray capacitance resulted in a frequency response roll at a lower frequency than was desirable. Also, due to the varying current and the particular value of the load resistor 7, the anode voltage of the photomultiplier tube was not fixed at essentially one value, thereby resulting in poor linearity.

Referring now to FIG. 2, the present invention, the anode 13 of the photomultiplier tube has been terminated in a very low impedance transistor load. The results of this is that the frequency response will be higher because its shunt capacitance will have a lesser effect at comparable frequencies. Additionally, it allows the photomultiplier tube to operate as a more ideal current source, and fixes the anode voltage at essentially one value thereby improving linearity.

The photomultiplier tube's anode 13, is coupled over line 15 to terminal 17, of a grounded base transistor amplifier 19. A one microfarad capacitor 21, and 20K resistor 23, is coupled to a —30 volt power supply 25, so as to provide filtering for said power supply 25. A 100K resistor 27, coupled to the junction 29, of capacitor 21, and resistor 23, functions as the forward biasing resistor so that transistor 19 coupled to it, is biased on at all times, and the base 31 of said transistor 19, is grounded. Coupled to transistor 19 is load resistor 33, coupled to collector electrode 35. In operation, the input current from the photomultiplier tube's anode 13, is coupled over line 15 to the base of transistor 19, where it is amplified in a conventional manner, resulting in the input signal being transferred to the collector resistor 33, where the voltage drop developed across it is subsequently transferred to an output circuit (not shown) through a conventional two-stage transistor emitter-follower circuit 37. Due to this particular grounded base input configuration of the transistor stage 19, which is coupled to the photomultiplier's anode 13, the load resistor 33 is isolated and hence the anode 13 "sees ground," and the current flowing into the anode is essentially transferred to the collector load resistor 33, where the voltage drop provides the output signal which is proportional to the incident light on the photomultiplier tube's photocathode.

Obviously many modifications and variations of the present invention are possible in the light of the above teachings.

What is claimed is:

1. An amplifier for the output from a photomultiplier tube anode, said amplifier comprising:
   - a first transistor having base, emitter, and collector means;
   - means for connecting said emitter means directly to a photomultiplier tube anode;
   - series connected first and second resistance means connecting said emitter means to a source of D.C. potential below ground potential;
   - third resistance means connecting said collector means to a source of D.C. potential above ground potential;
   - said base means being connected directly to ground potential;
   - filter capacitor means connected on one side to ground potential and on the other side to a junction between said first and second resistance means; and two-stage emitter follower transistor means connected so as to provide an output which varies in accordance with changes in voltage drop across said third resistor means.

References Cited

UNITED STATES PATENTS

| | | | |
|---|---|---|---|
| 2,812,445 | 11/1957 | Anderson | 250—211 |
| 2,935,623 | 5/1960 | Overbeck et al. | 307—88.5 |
| 3,271,699 | 9/1966 | Marzan et al. | 250—207 |

OTHER REFERENCES

"Photomultiplier Tube Amplifier" by N. H. Kreitzer and D. Feheb, IBM Technical Disclosure Bulletin, vol. 8, No. 6, November 1965, p. 929.

"Basic Theory and Application of Transistors," Army Technical Manual TM11–690, Headquarters. Dept. of the Army, March 1959, pp. 43, 44, 45, 109, 110.

NATHAN KAUFMAN, *Primary Examiner.*

U.S. Cl. X.R.

330—19, 32